March 7, 1950 M. E. NEBEL 2,499,522
CINEMATOGRAPH PROJECTOR FOR FILMS HAVING
PICTURES ARRANGED IN PLURAL ROWS
Filed Feb. 13, 1947 2 Sheets-Sheet 1

Inventor
M. E. Nebel
By Stewart Downing Suttle
Attys

March 7, 1950

M. E. NEBEL 2,499,522

CINEMATOGRAPH PROJECTOR FOR FILMS HAVING
PICTURES ARRANGED IN PLURAL ROWS

Filed Feb. 13, 1947

Inventor
M. E. Nebel
By Stason Downing Seebold
Attys.

Patented Mar. 7, 1950

2,499,522

UNITED STATES PATENT OFFICE 2,499,522

CINEMATOGRAPH PROJECTOR FOR FILMS HAVING PICTURES ARRANGED IN PLURAL ROWS

Miguel Enrique Nebel, Barcelona, Spain

Application February 13, 1947, Serial No. 728,268
In Great Britain February 19, 1946

7 Claims. (Cl. 88—16)

This invention relates to cinematograph projectors, particularly to such as are intended to be used as a toy, of the kind which employ a film having pictures arranged in a plurality of adjacent longitudinal rows, and in which a transverse scanning of the film takes place simultaneously with the longitudinal feed of the film.

The object of the invention is to provide an improved cinematograph projector of the kind referred to, in which each of a number of cyclic movements can be projected on to a screen a number of times, thus producing the illusion of continuous cyclic movement, and effecting a great saving of film in the projection of such cyclic movement.

The film used, for example, could be a 35 mm. standard film subdivided into four longitudinal rows of pictures, each series of pictures, representing the different phases of a cyclic movement, extending in a transverse row across the film.

In the present invention, a cinematograph projector of the above kind is provided with means for producing a slow interrupted longitudinal movement of the film, and with means for producing an interrupted reciprocating transverse movement of the film, and the said two means are so interconnected that the longitudinal and transverse interrupted movements always take place simultaneously, and that each section of the film is transversely scanned a number of times during its longitudinal passage past the gate.

Means are also provided for interrupting the interconnection between the means effecting the longitudinal movement of the film and the means effecting the transverse movement thereof, thereby allowing either longitudinal movement of the film, e. g. for the insertion of a film; or its independent transverse movement, i. e. the repeated transverse scanning of the same section of film.

In the accompanying drawings—

Figure 1:
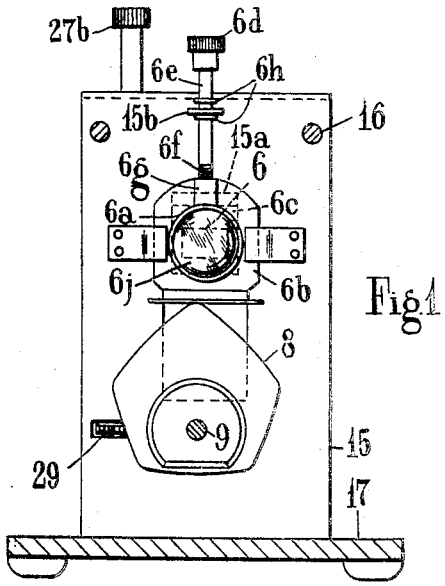
Figure 1 is a vertical section on the line A—A of Figure 2, with the outer casing of the projector removed.
Figure 2:
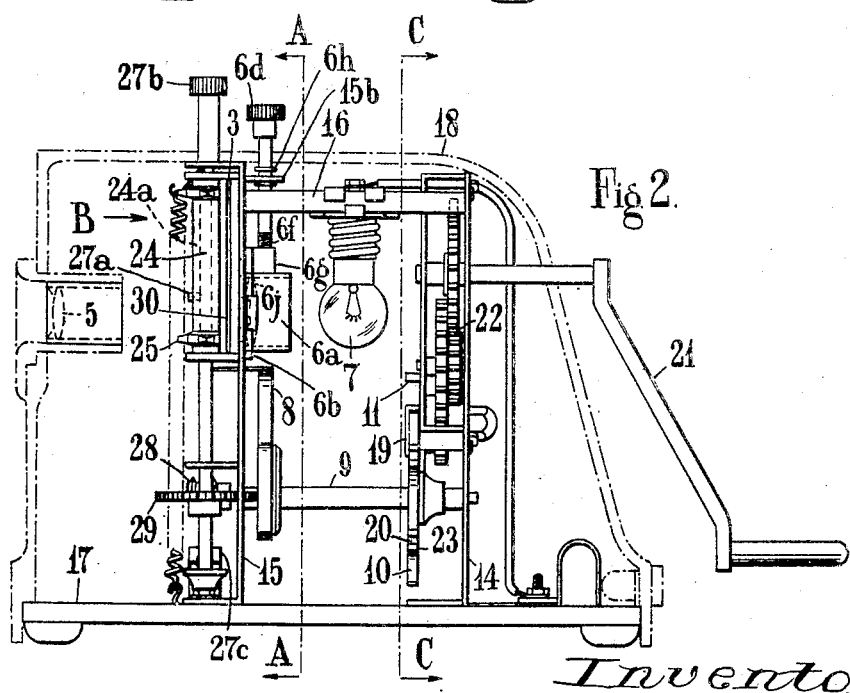
Figure 2 is a side elevational view of one construction of projector in accordance with the invention, with the outer casing carrying the projector lens shown in chain dotted lines.
Figure 3:
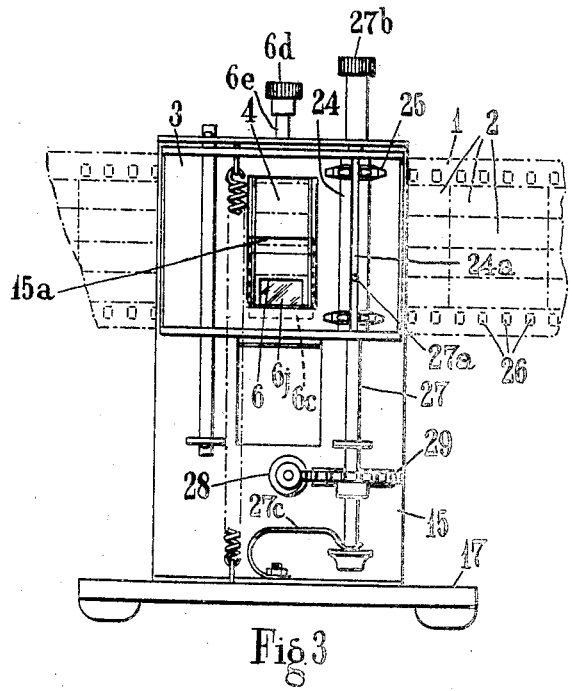
Figure 3 is a front elevational view of Figure 2, with the outer casing removed and looking in the direction of the arrow B.
Figure 4:
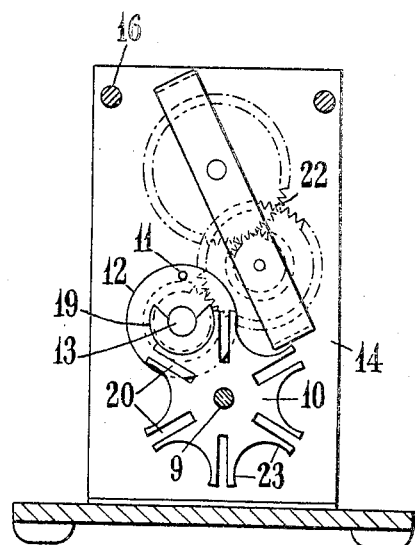
Figure 4 is a vertical section on the line C—C of Figure 2, also with the outer casing removed.

In carrying the invention into effect in one convenient manner as illustrated in the drawings, a cinematograph projector is provided wherein a film 1 having an arrangement of pictures or representations 2 thereon as above described is supported on a frame 3 so that the film extends horizontally past the gate 6, in front of which there is the usual projector lens 5 for focussing the images on to a screen and which gate is illuminated through an elongated slot 4 in the frame 3. A small electric lamp 7 is fitted behind the gate 6 and in order that the film may be reciprocated vertically, step-by-step, with respect to the projector system the frame 3 is mounted for vertical reciprocatory motion under the control of a cam element 8 which is of polygonal form and is eccentrically mounted upon a rotary shaft 9 which carries also a Maltese cross 10 which is actuated by a pin member 11 (the Maltese cross and its co-operating pin forming a Geneva gear, such as is well known) so as to cause the polygonal cam element to rotate intermittently, with the result that the film is reciprocated step wise up and down but in such manner that as the successive pictures are brought opposite the gate they remain there momentarily until the next picture, by a further actuation of the frame by the action of the polygonal cam element, jumps into position.

The pin 11 is carried upon a disc 12 mounted upon a shaft 13 rotatably mounted upon a rear vertical end plate 14 of a frame which includes a front vertical end plate 15, the two end plates being connected together by transverse stays 16 and the whole being mounted upon a base 17 which normally supports an outer, but removable, casing 18 carrying the lens 5 at its front end.

The disc 12 carries the usual segment 19 found on a Geneva gear to permit the Maltese cross to be rotated intermittently only when the pin 11 is in engagement with one of the radial slots 20 of the cross and in the use of the projector the disc 12 is arranged to be rotated continuously, as by the rotation of a handle 21, which drives the disc through a gear train 22.

Thus the member 12 carrying the pin 11 may be arranged to be rotated by the actuation of a handle 21, clock-work device or by an electric motor, for example, and the arrangement is such that the rotary motion is transformed, by the action of the Maltese cross and pin, into an intermittent or a jerky rotary motion. For instance, the Maltese cross, having a radial slot 20 in each of its six arms 23 makes a quick turn of 60°, then stands still for ⅕ second and so on. The polygonal cam element 8, performing the same jerky rotation as the Maltese cross, causes the frame 3, supporting the film, to move up and down with a similar jerky action, the shape of the polygonal cam element being such that for each of said turn of 60°, the frame 3 is pushed up or down by exactly the height of one picture on the film.

In this way, through the combined action of the Maltese cross and the polygonal cam element the pictures of each transverse sequence thereof on the film are made to appear in front of the gate and stop there for a period of e. g. ⅕ second, the change-over from one picture to the other however being so quick as not to be noticeable to the eye.

Simultaneously with the aforesaid vertical reciprocation of the film the latter is also required to be moved slowly longitudinally so that one transverse sequence of pictures after the other appears opposite the gate. This longitudinal film motion can be effected by a film sprocket 24, having teeth 25 engaging in the film perforations 26, being slidably mounted upon a vertical rotary driving spindle 27 which operates to rotate the sprocket but at the same time allows the latter to reciprocate axially together with the film carrier or frame 3, the spindle 27 being conveniently driven from the same main gearing 22 as that employed for rotating the shaft 9 carrying the polygonal cam element and the Maltese cross and such driving connection for the spindle being conveniently afforded by a worm 28 on the shaft 9 engaging with a worm wheel 29 at the lower end of the spindle. The film sprocket 24 is in the form of a sleeve which has an elongated slot 24a in which a pin 27a on the spindle 27 engages to provide a rotary driving connection between the spindle and the film sprocket, which connection, however, is such as permits the spindle 27, by actuation of the knob 27b, to be lifted, against the action of a restoring spring 27c, to cause the worm wheel 29 on the spindle to be disengaged from the worm 28. By this means, and while the spindle 27 is held in a raised position with its worm wheel disengaged from the worm 23, it is possible, by rotation of the spindle, to rotate the film sprocket independently of the gearing referred to. Such independent rotation of the film sprocket may be resorted to when it is desired to insert a new film and provides also for the moving of the film longitudinally, backwards or forwards, independently of the transverse motion above-mentioned.

The film carrier 3 has a transverse slot 30 through which the film can be inserted from one side of the carrier and guided through the latter for delivery at its opposite side as the film sprocket 24 operates to effect the longitudinal feeding movement of the film in the operation of the projector.

The gate 6 incorporates the condenser lens 6j, which latter is mounted immediately behind the gate and is carried at the inner end of a cylindrical shroud 6a which projects rearwardly from one face of a plate 6b, the front face of which plate is formed with a rectangular frame 6c the opening in which defines the gate 6. This frame part 6c is mounted for vertical adjustable sliding movement within a corresponding recess 15a on the front face of the fixed plate 15. Vertical adjustment of the thus combined gate and condenser lens is effected by the actuation of a knob 6d on a spindle 6e having an inner screw-threaded end 6f which engages in a correspondingly screw-threaded bore in a block 6g integral with the plate 6b. The spindle 6e is guided through an opening in a bracket 15b projecting rearwardly from the plate 15 and the desired relative movement between the spindle and the block is obtained by the provision upon the spindle of a pair of axially spaced collars 6h either of which is moved into abutting relationship with the bracket 15b depending upon the direction of rotation of the spindle 6e. This provision for vertical adjustment of the combined gate and condenser lens enables the gate and lens to be accurately set so that they will register with the rows of pictorial matter on the film, the actual dispositioning of which rows may vary for different films. On the other hand the combination of the gate and condenser lens upon a common part (i. e. the plate 6b, shroud 6a and frame 6c all of which are integral with each other) ensures that the condenser lens remains always in correct register with the gate.

I claim:

1. A cinematograph projector for films having pictures arranged in a plurality of adjacent longitudinal rows for projection through a gate, comprising means including a cam for effecting an interrupted reciprocatory transverse movement of the film, in combination with means for feeding the film longitudinally comprising a sprocket for engagement with the perforations in the film and a rotary shaft carrying the said sprocket, and driving means between the means for effecting the transverse movements of the film and the shaft carrying the said sprocket, including a speed-reducing gear, whereby the reciprocatory transverse movement of the film is effected interruptedly and the longitudinal feeding movement is also effected interruptedly simultaneously with the interruptions in the transverse movement so that each section of the film is transversely scanned a number of times during its longitudinal passage past the gate.

2. A cinematograph projector for films having pictures arranged in a plurality of adjacent longitudinal rows for projection through a gate, comprising means for effecting an interrupted reciprocatory transverse movement of the film, in combination with means for simultaneously interruptedly feeding the film longitudinally comprising means for engagement with said film and a rotary shaft carrying said last means, and driving means for effecting said movements of the film and the shaft carrying said engaging means whereby the reciprocatory transverse movement of the film is effected interruptedly and the longitudinal feeding movement is also effected interruptedly simultaneously with the interruptions in the transverse movement so that each section of the film is transversely scanned a number of times during its longitudinal passage past the gate.

3. A cinematograph projector for films having pictures arranged in a plurality of adjacent longitudinal rows for projection through a gate, comprising means including a polygonal cam for effecting an interrupted reciprocatory transverse movement of the film, in combination with means for simultaneously interruptedly feeding the film longitudinally comprising means for engagement with said film and a rotary shaft carrying said last means, and driving means for effecting said movements of the film and the shaft carrying said engaging means, whereby the reciprocatory transverse movement of the film is effected interruptedly and the longitudinal feeding movement is also effected interruptedly simultaneously with the interruptions in the transverse movement so that each section of the film is transversely scanned a number of times during its longitudinal passage past the gate.

4. A cinematograph projector for films having pictures arranged in a plurality of adjacent longitudinal rows for projection through a gate, comprising means for effecting an interrupted reciprocatory transverse movement of the film, in combination with means for simultaneously interruptedly feeding the film longitudinally including a sprocket for engagement with the perforations in the film and a rotary shaft carrying the said sprocket, and driving means for effecting said movements of the film and the shaft carrying the said sprocket, whereby the reciprocatory transverse movement of the film is effected interruptedly and the longitudinal feeding movement is also effected interruptedly simultaneously with the interruptions in the transverse movement so that each section of the film is transversely scanned a number of times during its longitudinal passage past the gate.

5. A cinematograph projector for films having pictures arranged in a plurality of adjacent longitudinal rows for projection through a gate, comprising means for effecting an interrupted reciprocatory transverse movement of the film, in combination with means for simultaneously interruptedly feeding the film longitudinally comprising means for engagement with said film and a rotary shaft carrying said last means, and driving means including a Geneva gear and Maltese cross arrangement for effecting said movements of the film and the shaft carrying said engaging means, whereby the reciprocatory transverse movement of the film is effected interruptedly and the longitudinal feeding movement is also effected interruptedly simultaneously with the interruptions in the transverse movement so that each section of the film is transversely scanned a number of times during its longitudinal passage past the gate.

6. A cinematograph projector for films having pictures arranged in a plurality of adjacent longitudinal rows for projection through a gate, comprising means for effecting an interrupted reciprocatory transverse movement of the film, in combination with means for simultaneously interruptedly feeding the film longitudinally comprising means for engagement with said film and a rotary shaft carrying said last means, and driving means for effecting said movements of the film and the shaft carrying said engaging means, including a speed reducing gear, whereby the reciprocatory transverse movement of the film is effected interruptedly and the longitudinal feeding movement is also effected interruptedly simultaneously with the interruptions in the transverse movement so that each section of the film is transversely scanned a number of times during its longitudinal passage past the gate.

7. A cinematograph projector for films having pictures arranged in a plurality of adjacent longitudinal rows for projection through a gate, comprising means including a cam for effecting an interrupted reciprocatory transverse movement of the film, in combination with means for simultaneously interruptedly feeding the film longitudinally comprising a sprocket for engagement with the perforations in the film and a rotary shaft carrying the said sprocket, driving means including a Geneva gear and Maltese cross arrangement for effecting said movements of the film and the shaft carrying the said sprocket, means for disengaging said shaft from said driving means to permit independent rotation of said sprocket, and a speed reduction gear operatively connecting said shaft and said driving means, whereby the reciprocatory transverse movement of the film is effected interruptedly and the longitudinal feeding movement is also effected interruptedly simultaneously with the interruptions in the transverse movement so that each section of the film is transversely scanned a number of times during its longitudinal passage past the gate.

M. E. NEBEL.

REFERENCES CITED

The following references are of record in the file of this patent:

UNITED STATES PATENTS

| Number | Name | Date |
| --- | --- | --- |
| 1,236,319 | Kleidman | Aug. 7, 1917 |
| 1,395,137 | Pluderi | Oct. 25, 1921 |
| 1,557,597 | Lube | Oct. 20, 1925 |
| 1,713,220 | Ericksen et al. | May 14, 1929 |
| 1,861,496 | Guggenheim | June 7, 1932 |
| 2,136,486 | Blondin | Nov. 15, 1938 |
| 2,213,613 | Sassoli | Sept. 3, 1940 |
| 2,216,478 | Paillard | Oct. 1, 1940 |